United States Patent
Huck (10) Patent No.: US 7,529,183 B2
(45) Date of Patent: May 5, 2009

(54) METHOD OF SETTING UP A BACKUP PATH IN A TRANSPORT NETWORK

(75) Inventor: Martin Huck, Marbach (DE)

(73) Assignee: Alcatel, Paris (FR)

( * ) Notice: Subject to any disclaimer, the term of this patent is extended or adjusted under 35 U.S.C. 154(b) by 580 days.

(21) Appl. No.: 11/207,949

(22) Filed: Aug. 22, 2005

(65) Prior Publication Data

US 2006/0045007 A1 Mar. 2, 2006

(30) Foreign Application Priority Data

Sep. 1, 2004 (EP) .................................. 04292117

(51) Int. Cl.
*G01R 31/08* (2006.01)
*G06F 11/00* (2006.01)
*H04L 1/00* (2006.01)
*G08C 15/00* (2006.01)

(52) U.S. Cl. ........................ 370/226; 370/218; 370/228; 709/239

(58) Field of Classification Search ................ 370/216, 370/225–228; 709/238–239
See application file for complete search history.

(56) References Cited

U.S. PATENT DOCUMENTS

| | | | | |
|---|---|---|---|---|
| 6,992,979 | B2 * | 1/2006 | Hauser et al. | 370/228 |
| 7,133,359 | B2 * | 11/2006 | Weis | 370/222 |
| 7,142,505 | B2 * | 11/2006 | Chaudhuri | 370/225 |
| 7,180,852 | B1 * | 2/2007 | Doverspike et al. | 370/217 |
| 7,295,510 | B2 * | 11/2007 | Johri | 370/216 |
| 7,298,693 | B1 * | 11/2007 | Owens et al. | 370/216 |
| 7,352,966 | B2 * | 4/2008 | Chaudhuri et al. | 398/5 |
| 7,451,340 | B2 * | 11/2008 | Doshi et al. | 714/4 |
| 2002/0112072 | A1 | 8/2002 | Jain | |
| 2003/0147344 | A1 * | 8/2003 | Stewart et al. | 370/216 |
| 2003/0147346 | A1 | 8/2003 | Kanakubo | |
| 2004/0052207 | A1 * | 3/2004 | Charny et al. | 370/216 |
| 2004/0156313 | A1 | 8/2004 | Hofmeister et al. | |
| 2004/0190446 | A1 | 9/2004 | Ansorge et al. | |

FOREIGN PATENT DOCUMENTS

EP 1 463 370 A1 9/2004

\* cited by examiner

*Primary Examiner*—Chi H Pham
*Assistant Examiner*—Warner Wong
(74) *Attorney, Agent, or Firm*—Sughrue Mion, PLLC (57) ABSTRACT

Paths in a transport network are identified by labels (n1-n4, b1-b4) and more than one restoration resources that can be used for setting up a particular backup path form a restoration group. Backup tables (R1, R7) are provided, which define restoration groups per path labels (b1-b4), only, rather than individual restoration resources. Upon initial receipt of a path label (b1-b4), a network element (1-13) selects according to pre-determined rules a particular restoration resource from the restoration group defined in the backup table (R1-R7) for this backup path label.

20 Claims, 5 Drawing Sheets

METHOD OF SETTING UP A BACKUP PATH IN A TRANSPORT NETWORK

The invention is based on a priority application EP 04292117.1 which is hereby incorporated by reference.

FIELD OF THE INVENTION

The present invention relates to the field of telecommunications and more particularly to a path restoration method in a transport network and a network element with fast restoration capabilities.

BACKGROUND OF THE INVENTION

Transport networks serve for the physical layer transport of high bitrate tributary signals. In particular, the signals transmitted over a transport network are encoded and multiplexed into a continuous bit stream structured into frames of the same length. Within this constant bitrate bit stream, the frames are repeated periodically with a frame repetition rate of typically 8 kHz and are structured according to a multiplexing hierarchy. An example of such a miultiplexing hierarchy is SDH (Synchronous Digital Hierarchy, see ITU-T G.707 10/2000) where the frames are termed synchronous transport modules of size N (STM-N, where N=1, 4, 16, 64, or 256). The frames have a section overhead and contain at least one higher order multiplexing unit called virtual container VC-4. A VC-4 can either directly carry a tributary signal or a number of lower order multiplexing units like VC-12 or VC-3, which then carry tributary signals.

Virtual containers are transmitted from source to sink through an SDH network and therefore represent a "logical" path through the network. The sequence of identical VCs having the same relative position in subsequent frames forms a traffic stream along that path. Each VC contains a path overhead (POH) and a payload section referred to as container (C). The US equivalent of SDH is known as SONET (Synchronous Optical Network).

A very basic aspect in all types of transport networks is availability and reliability of service. In other words, a transport network must be very robust against any kind of failure and the average outage time must be very low. Hence, a transport network needs to provide the means and facilities to ensure sufficient availability. Typically, network mechanisms which ensure this availability are distinguished in protection and restoration. The common principle of both is to redirect traffic of a failed physical link or logical path over a spare resource.

Protection is a mechanisms where an already established protection path or link is assigned to one selected high-priority path or link (known as 1+1 or 1:1 protection, depending on whether there is low priority extra traffic on the protection resource or not) or a group of n such selected paths or links (known as 1:n protection). In the case of a failure, traffic can be re-routed very fast over the previously established protection resource under the sole control of the affected network elements in typically less than 50 ms. However; this requires a protocol between the affected nodes to signal and synchronize switch-over. Protection is a high-quality service restricted to few selected premium connections, which are typically charged at a higher price. Moreover, protection requires a high amount of spare resources compared with the amount of protected resources, i.e., 100% of spare capacity in the case of 1+1 protection.

Restoration refers to a mechanism, where the network searches for restoration capacity and establishes a backup path only after service path failure. Rather than calculating the backup path after failure, pre-calculated restoration routes can be used instead but with the actual cross-connection to establish the path performed after failure. Restoration mechanisms are more stringent in the usage of spare capacity and however, provide a masking of the failure at a lower speed, typically in the range of a few seconds since completely new paths through the network must be established.

In label switched packet networks, as opposed to transport networks, alternative label switched paths (LSPs) can already be implemented and then used in the case of a failure. The fundamental difference between transport networks and packet networks, where MPLS applies (Multi-Protocol Label Switching), is that in packet networks statistical multiplexing is used allowing over-subscription of links and that an LSP can be established without using any bandwidth. However, in transport networks, if a path is established, then by definition the full bandwidth requested by the path is consumed, independent of whether traffic is transmitted over this path or not. An LSP can be established before failure in MPLS, but not used until after failure, whereas this is not possible in transport networks.

The IETF proposal "RSVP-TE Extension for Shared-Mesh Restoration in Transport Networks" by G. Li et al, draf-li-shared-mesh-restoration-01.txt, addresses this issue and proposes an GMPLS extension where backup paths are pre-established in the management plane of the network but only activated after detection of a failure. This requires signaling messages to be exchanged in the management plane, which in a GMPLS controlled network is distributed across the entire network. This interaction of a decentralized network management is, however, a relatively slow process, which leads to restoration times in the range of at least some hundred milliseconds.

U.S. Pat. No. 2003/0147346 A1 describes a label switching router, a label switching network and a label switched path setting method in an MPLS (Multi-Protocol Label Switching) network. If an label switched router detects a fault in a label switched path, it retrieves an label switched path fault indication retrieval table to solve the label switched path fault. After solving it, the label switched router notifies a label switched path fault indication derived from the table to a corresponding protection point. In the label switched router at the protection point, switching of an alternate label switched path as designated from the information contained in that message is performed.

In the patent application U.S. Pat. No. 2004/0190446, an alternative restoration method has been proposed, which will be called herein label based restoration (LBR). The principle of LBR is that each path is identified with a label (or path tag) and forwarding information is provided in each network element. A backup path is activated by inserting its label on a selected restoration resource. The label is detected by the subsequent node and interpreted as an LBR request. The subsequent node checks the received label, determines an appropriate output port based on the label and the forwarding information, and sends a similar request at the selected output port. For better performance, the restoration can be started at both sides of the failed link. This label-based restoration has, however, some drawbacks. Since the requests arrive randomly at the nodes, the nodes will search and allocate resources in a random sequence. Due to this, contentions may result if two nodes allocate the same resource for different paths. Furthermore, the forwarding tables have to be updated once a resource is used for a backup path. This has grave disadvantages for the network managing control plane and the network behavior. Backup routes have to be recalculated after each single restoration event, which results in heavy reconfiguration activities in the whole control plane and thus slows down other activities such as path provisioning and maintenance. Moreover, as long as the backups are not reconfigured, they cannot recover further failures and forwarding tables are inconsistent until the reconfiguration of all nodes is completed. There exists therefore a need to reduce reconfiguration activities involved with a label-based restoration method.

SUMMARY OF THE INVENTION

It is an object of the present invention, to provide an improved restoration technique which allows faster restoration in a transport network than known restoration methods but requires less reconfiguration activity in the control plane of the transport network.

These and other objects that appear below are achieved by a restoration method of setting up a backup path in a transport network, wherein the transport network contains a number of physically interconnected network elements, wherein a path in the transport network is represented by a sequence of multiplex units transmitted at a predetermined frame position within consecutive frames and wherein idle frame positions in these frames constitute restoration resources. According to the invention the method contains the steps of:

assigning labels to paths in the transport network;
providing pre-configured backup tables to at least some network elements in the network, the backup tables define labels and a route through the network for the backup path;
activating the backup path at a first network element by inserting into a restoration resource available at a physical link along the route of the backup path the label of the backup path as defined by the backup table locally stored in the first network element; and
upon receipt of the backup path label at a second network element, determining an output port of the second network element for the backup path using the backup table locally stored in the second network element.

A network element is provided for a transport network that allows fast restoration. The network element has at least one input port designed for the reception of a transmission signal comprising frames, wherein a sequence of multiplex units transmitted at a predetermined frame position in consecutive frames represents a path through said transport network, and wherein idle frame positions in the frames constitute restoration resources;
a low-level control facility controlling the input port and comprising a memory for storing a backup table provided to the network element the backup table defines labels and a route through the network for a backup path; and
a switch matrix for connecting the multiplex units from the input port to any of a number of output ports under the control of the low-level control facility.

The low-level control facility is adapted to activate said backup path by selecting an output port from the backup table and by inserting into a restoration resource available at said selected output port the label of the backup path as defined by the backup table locally stored in the first network element;

According to another aspect of the present invention, a network element for a transport network is provided, which contains at least one input port designed for the reception of a transmission signal built of frames, wherein a sequence of multiplex units transmitted at a predetermined frame position in consecutive frames represents a path through the transport network, and wherein idle frame positions in the frames constitute restoration resources;
a low-level control facility controlling the input port and having a memory for storing a backup table provided to the network element, the backup table defines labels and a route through the network for a backup path;
a monitor assigned to the input port for checking path labels received at the input port and
a switch matrix for connecting the multiplex units from the input port to any of a number of output ports under the control of the low-level control facility.

The low-level control facility is adapted to determine an output port for a backup path using the backup table upon receipt of a backup path label at the input port and to configure the crossconnect matrix to establish an internal cross-connection between the input port and the selected output port to set up the backup path.

In particular, the paths in a transport network are identified by labels and more than one restoration resources that can be chosen for setting up a particular backup path form a restoration group. Backup tables are provided, which define restoration groups per path labels, only, rather than individual restoration resources. Upon initial receipt of a path label, a network element selects according to pre-determined rules a particular restoration resource from the restoration group defined in the backup table for this backup path label. Such pre-determined rules can include that a selection is made based on locally available information such as a resource number, and a re-selection in the case of a contention is made based on priority of the path to be restored and/or the node ID.

BRIEF DESCRIPTION OF THE DRAWINGS

Preferred embodiments of the present invention will now be described with reference to the accompanying drawings in which.

DETAILED DESCRIPTION OF THE INVENTION

Figure 1:
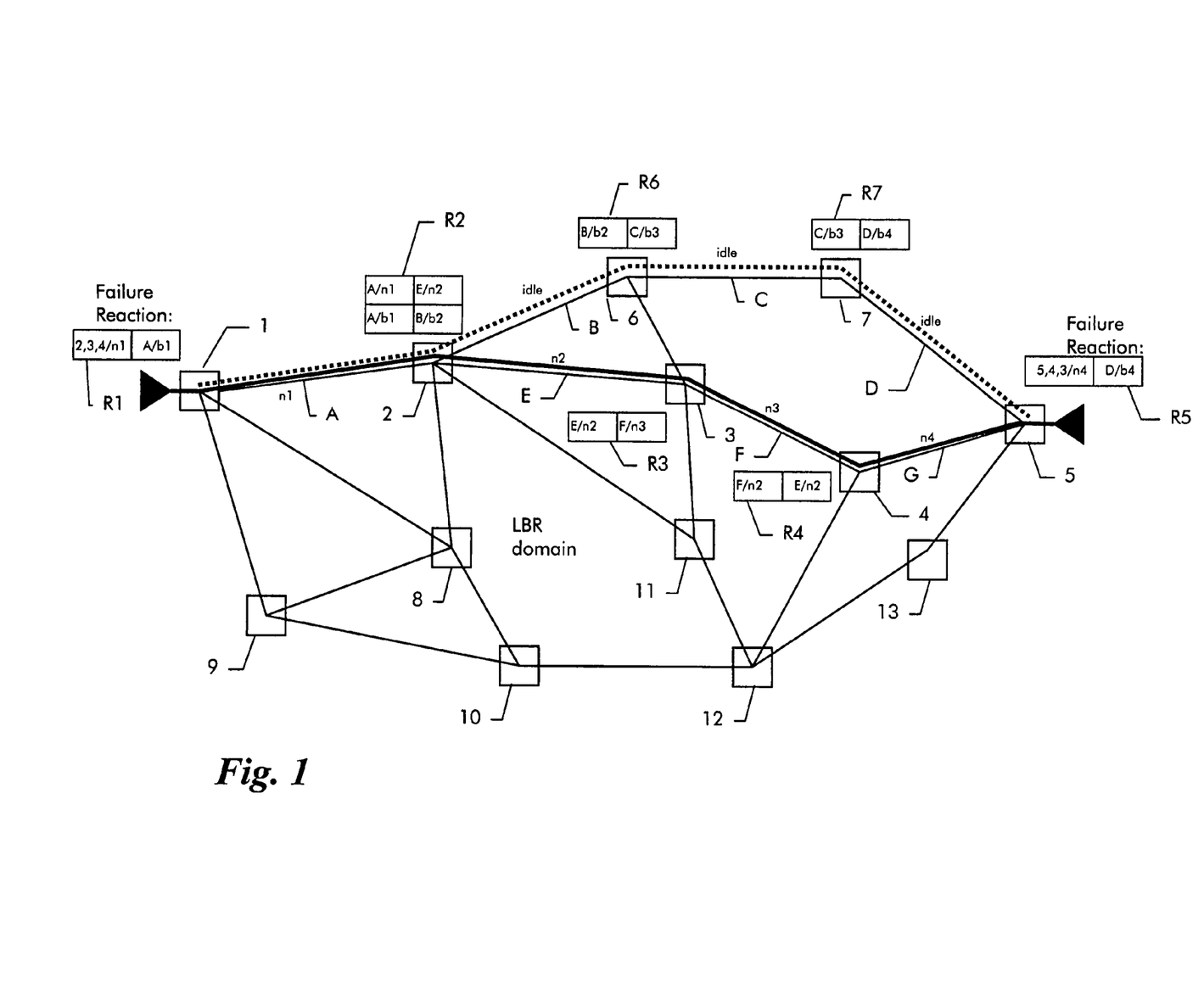
FIG. 1 shows an example network topology with a path and a potential backup path.

A transport network is shown by way of example in FIG. 1. The network elements 1-13 are mutually interconnected by physical links. A path is established (shown as a solid line) from network element 1 over intermediate network elements 2, 3, and 4 to network element 5. The broken line indicates a backup path, that can be activated in the case of a failure somewhere along the working path between network elements 1 and 5.

The invention makes use of a new restoration approach termed label-based restoration (LBR), which has the efficiency of traditional restoration but with faster backup capability since restoration time is in the range known from traditional protection switching. This is achieved by splitting the time-consuming resource provisioning from the fast activation phase. Backup paths are routed and configured in advance but they do not consume transmission resources until they are activated. The activation is done at the lowest available software layer close to the hardware. Therefore, no high level communication between neighbored nodes or between different software layers inside a node is needed.

The only communication for path activation uses a proprietary in-band signal termed internal tandem connection (ITC), which is added to/removed from the path overhead (POH) K3 byte at the network access nodes 1 and 5. The ITC provides differentiation between domain internal and domain external path failures, direct fault localization at the access nodes, and activation control for nominal and backup paths.

The principle of label-based restoration is as follows: All nodes supporting LBR are able to exchange a limited set of information via the VC POH K3 byte. The nodes are interconnected by link bundles which are termed traffic engineering links (TEL). The link availability is monitored with standard section monitoring.

A label is used to identify a path at the node interface and to decide to which egress port the path has to be connected. This decision is controlled with pre-configured LBR tables in each network node. These LBR tables are denoted with reference numerals R1-R7 in FIGS. 1 to 3.

The label address range is limited and allows only to identify the path an a link basis and not unambiguously in the whole network. Thus, a path uses different labels on each link. This is shown in FIG. 1, where the bold path between network element 1 and network element 5 has label n1 on link A, label n2 on link E, label n3 on link F, and label n4 on link G.

When setting up the bold path shown in FIG. 1, for instance, network element 2 receives label n1 on its left hand side interface. Upon reception, it identifies the path and its entry in the LBR table. The LBR table determines the destination link E and the next label n2. Network element 2 thus inserts label n2 in direction towards network element 3. Network element 3 in turn will do the same on reception of label n2 and this way, the path is connected hop-by-hop through the network. In order to reduce setup time during restoration, the activation is preferably driven from both access nodes 1 and 5 in parallel and the request will meet somewhere in the domain. Upon successful activation, the nodes report the changed resource status to the network management plane and the manager may have to update the registered paths in the nodes.

Misconnections are avoided because each node in the network connects the path only if it has received an acknowledgment from the opposite node.

Once the path is connected, the label exchange is monitored. In the case of a failure, the exchanged information between the nodes is replaced with a failure information, which allows the nodes to decide, where the failure happened and which backup has to be activated.

Tables R1 and R7 at the access nodes 1 and 7 define the reaction upon a certain failure. The solid line represents the nominal path; which is connected and which consumes resources. The broken line represents the backup path. In contrast to the nominal path, the backup path does not consume any transmission resources since it is not activated but only the labels and destinations are configured in the LBR tables along the backup path. This is an important characteristic of LBR, because it allows to overbook resources, i.e., to define more backup paths than backup capacity is available.

In the embodiment shown in FIG. 1, the backup path is only partially route divers to the nominal path, i.e. a failure at link A would required a different backup path (not shown). Again, this reuse increases network utilization, shortens the backup path length, and provides more flexibility to define backup paths.

In FIG. 1, the backup path can recover a failure of link E, F, or G. Depending on the failing link, the left access node 1 will receive as fault information 2, 3, or 4 and the right access node will receive 5, 4, or 3. The fault information corresponds to a node identifier and means that the nominal path fails on the link behind the indicated node.

Figure 2:
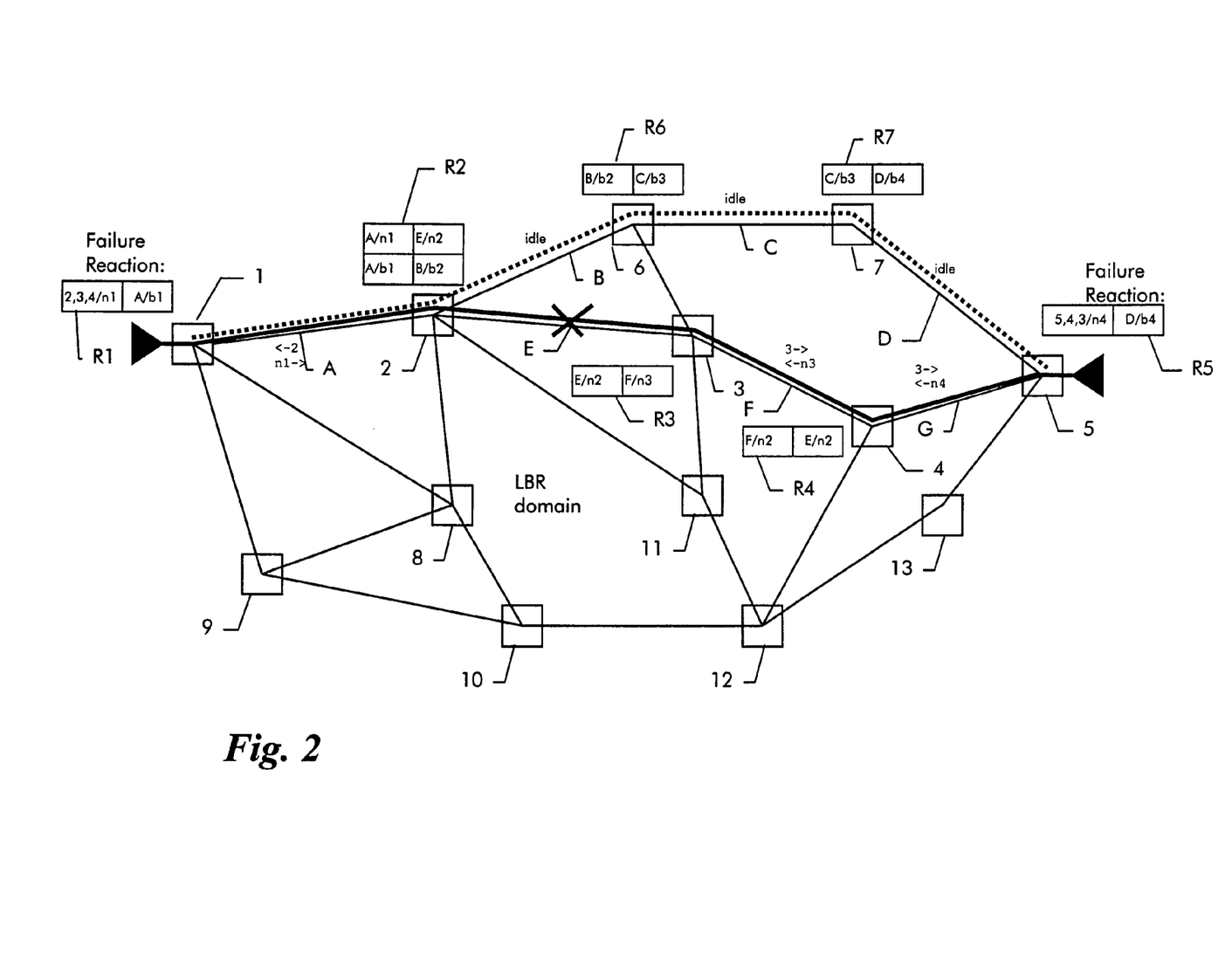
FIG. 2 shows a link failure in the network topology of FIG. 1 that leads to a restoration request for the affected path.

FIG. 2 shows the situation when link E fails in both directions. The nodes 2 and 3 adjacent to the failure detect the failure and the nominal path labels in the direction towards the access nodes are replaced with the fault information, which allows the access nodes to localize the failing link, i.e. link E. In other words, both nodes adjacent to the link insert their own node ID in the reverse direction, i.e. network element 3 sends the node ID 3 rather than the label n3 to network element 4 and network element 2 sends its node ID 2 rather than the label n2 to network element 1.

The access nodes 1 and 5 are thus informed of the failure and the failure location between nodes 2 and 3. Both access nodes 1 and 5 search now for a matching backup path entry for the combination of the failed nominal path and the received fault information and start activating the backup.

In the example shown in FIG. 2, the LBR reaction table R1 of network element 1 contains for a failure of the path with the label n1 reported by any of the nodes 2, 3, or 4 the failure reaction information, that the path is to be connected to the same link A but the label replaced with label b1. The LBR reaction table R5 of network element 5 contains the restoration information that in the case of a failure of path n4 reported by any of the network elements 5, 4, or 3, the path shall be connected to link D and shall have label b4.

Figure 3:
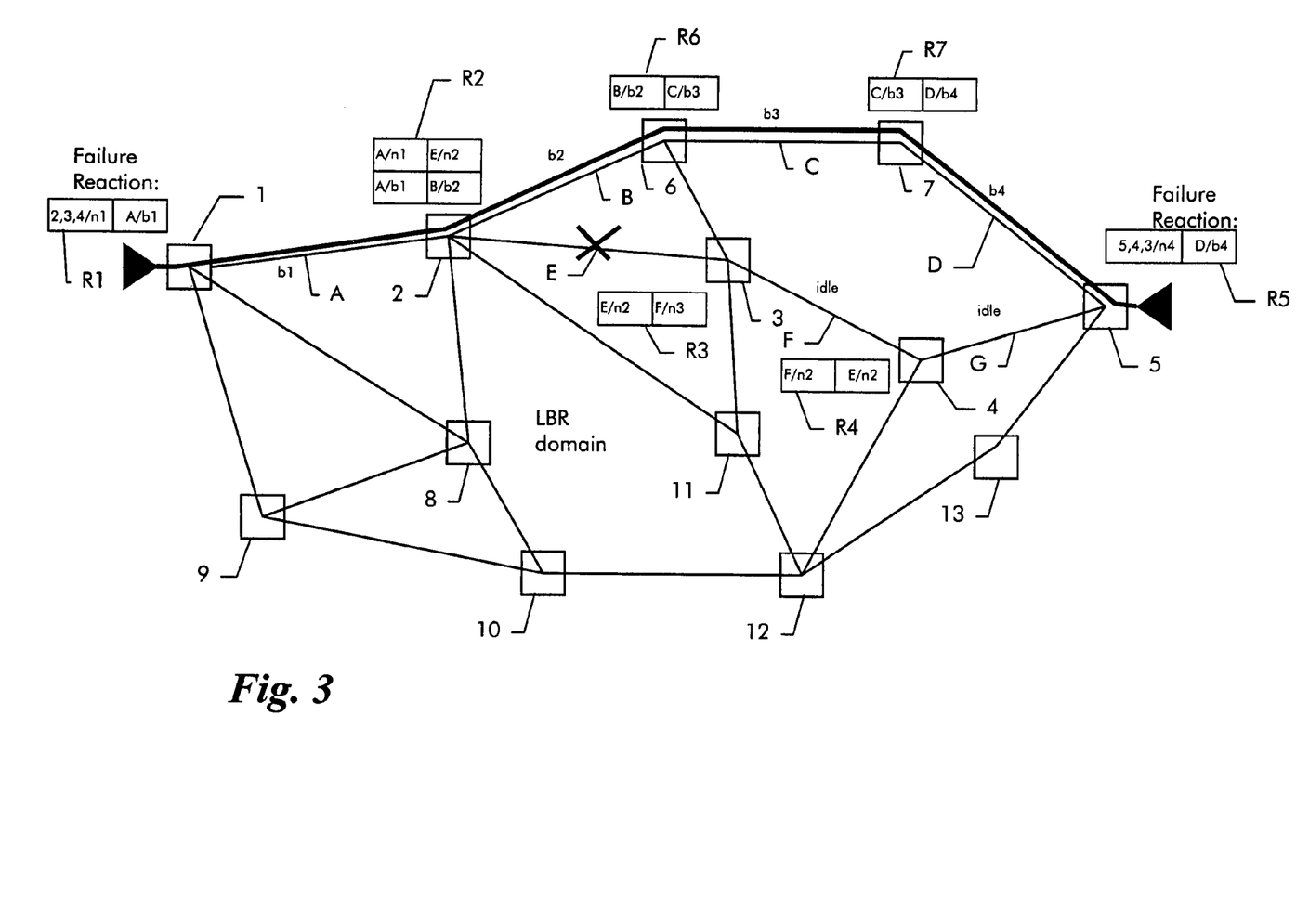
FIG. 3 shows the network topology of FIG. 1 after the failed path has been restored.

In this simplified example, only one backup path is pre-configured for the nominal path shown. It should be noted, however, that the reaction table can contain of course multiple entries for each nominal path. Moreover it is to be noted that the links A-G in FIGS. 1 to 3 are traffic engineering links and can contain one or more physical links or link bundles. On each traffic engineering link, more than only one restoration resources can be available.

According to the present invention, the LBR tables do not define individual restoration resources (i.e. the individual time slots) for the nominal paths but any restoration resources on the traffic engineering link that can be used for the restoration of a particular nominal path form a restoration group and the LBR tables define a restoration group per path label, only. The network elements select a particular restoration resource from the restoration group for the failed path according to pre-determined rules as will be explained below.

The network manager has only to define source and destination traffic engineering links and corresponding labels. This simplifies configuration and management of the backup paths. Moreover, after a backup is activated and consumes idle capacity, the manager does not need to reconfigure the remaining backups registered for the same restoration group. As long as there is enough idle link capacity, the configuration is ready to activate further backups. This reduces configuration activities and disburdens the control plane. Further failures can be restored immediately without waiting for a configuration update.

Selection at run time of the individual link from the link bundle of the traffic engineering link and of an individual timeslot implies a slight increase in software activity. However, the increase in total restoration time caused by this selection is negligible, because the restoration time required in total is mainly determined by transmission delays rather than by software processing.

If the activation of the backup starts from both ends of the failed link, a rendezvous strategy must be implemented. This is achieved through the use of certain rules according to which the network elements select the actual restoration resources from the traffic engineering link determined from the LBR table.

A first criterion for a selection is the resource number and the timeslot number. When selecting the timeslot, each network element shall start with the lowest link and timeslot number. For a single restoration request, this leads to a direct rendezvous of the two path segments that are set up hop-by-hop from both ends.

It could happen, however, that network elements have to process a set of restoration requests in parallel. This can happen, because links carry typically more than one path and if a link fails, all paths from that link have to be restored. Parallel processing of multiple restoration requests could lead to the situation that (a) different timeslots are assigned to the same backup (i.e., a mismatch) or (b) different backup paths are assigned to the same timeslot (i.e., a collision). Collision and mismatch are contentions which need to be resolved according to predetermined rules.

A first rule to solve a contention is that the path with the higher priority is kept and the request for the path with the lower priority removed. A new resource must then be selected and a new request launched for only the path with the lower priority, while the selection previously made for the path with the higher priority is kept and followed by the other network element.

In the case that two or more contending requests have equal priority level, a master/slave mechanism is applied, i.e., one node acts as the master and one as the slave. The slave has to remove its request and follow the selection of the master. The decision which network element is the master and which the slave is made upon installation of the system. In the preferred embodiment, the node with the lower node ID is the master and the one with the higher node ID is the slave. Therefore, the node with the higher node ID has to select another resource for its request and follows the previous selection of the node with the higher node ID.

Figure 4A:
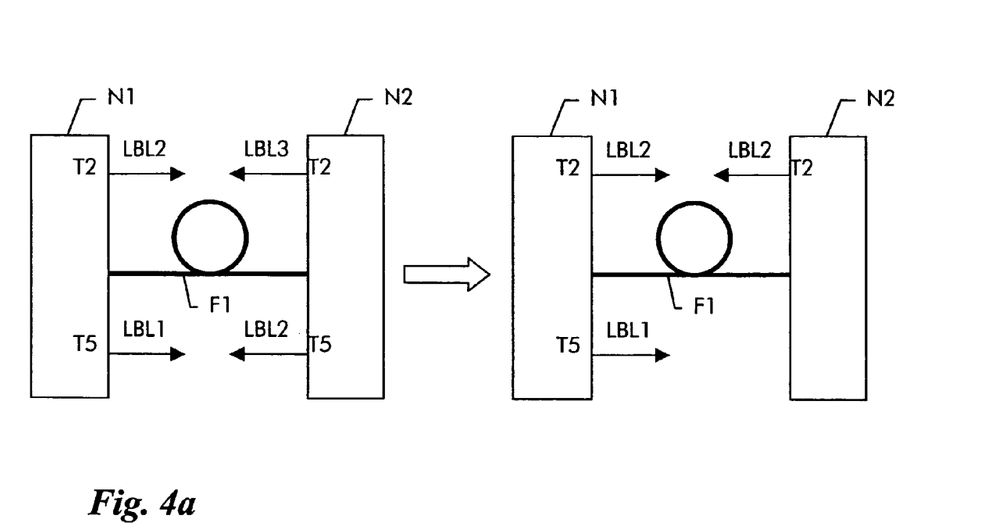
FIGS. 4a and 4b show the resolving of contentions occurring during restoration of multiple failed paths.
Figure 4B:
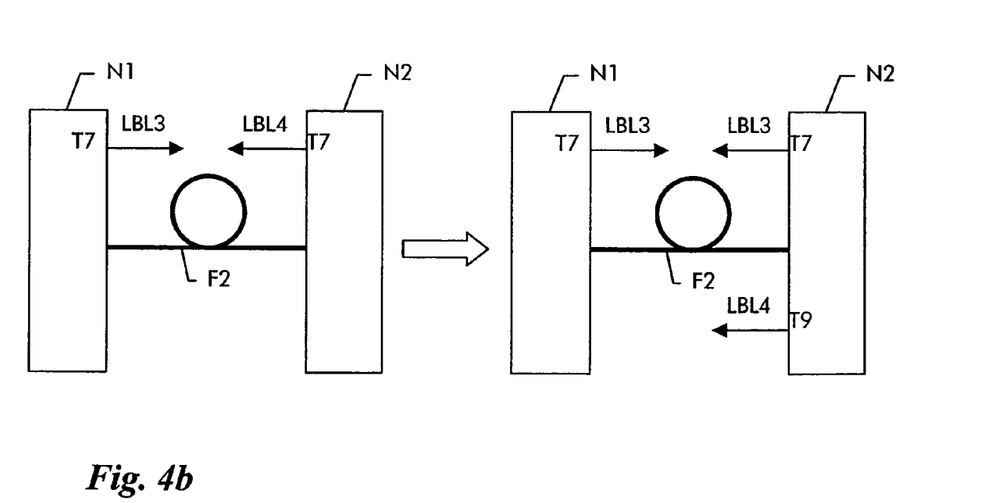

The resolving of a contention situation where all paths have the same priority is shown in FIGS. 4a and 4b. Two network elements NE1 and NE2 are interconnected by a traffic engineering link composed of two STM-N links, which are transported over two physically distinct optical fibers F1, F2. Network element N1 has the lower node ID and acts thus as a master while network element NE2 having the higher node ID acts as the slave.

FIG. 4a shows the restoration activities on the first link over fiber F1. Network element NE1 requests setup of a first backup path by inserting label LBL1 into idle timeslot T5 and setup of a second backup path by inserting label LBL2 into timeslot T2. At the same time, network element NE2 chooses the same timeslots but for different labels. NE2 sends label LBL2 on timeslot T5 and a label LBL3, which corresponds to a third restoration request, on timeslot T5.

The situation on the second link over fiber F2 is shown in FIG. 4b. Network element NE1 requests backup for label LBL3 on timeslot T7 while network element NE2 requests backup for label LBL4 on timeslot T7.

As soon as NE2 detects the contention, it clears its own selection and moves the label to the timeslot where it receives the same label. In particular, NE2 clears label LBL4 and moves label LBL3 from timeslot T2 on link F1 to timeslot T7 on link F2 and label LBL2 from timeslot T2 to timeslot T4. Then NE2 selects q new idle timeslot T9 for LBL4, i.e., LBL4 is moved to T9 of link F2. Conversely, NE1 as the master does not alter its selection. Slave requests that have to be moved to an idle timeslot such as LBL4 are delayed. All other requests are not delayed.

Turning back to FIG. 3, network element 1 replaces label n1 on link A with label b1 as defined in table R1 to activate the backup path for the failed nominal path. Network element 2 upon receipt of label b1 selects an idle timeslot for the backup path on link B and inserts label b2.

On the other side of the failed path, network element 5 selects an idle timeslot on link D and inserts label b4 and network element 7 upon receipt of label b4 selects an idle timeslot on link C and inserts label b3. At network element 6, the requests from both ends of the path meet and the backup path is completed. Now, the backup path really consumes idle resources on links B, C, and D.

Figure 5:
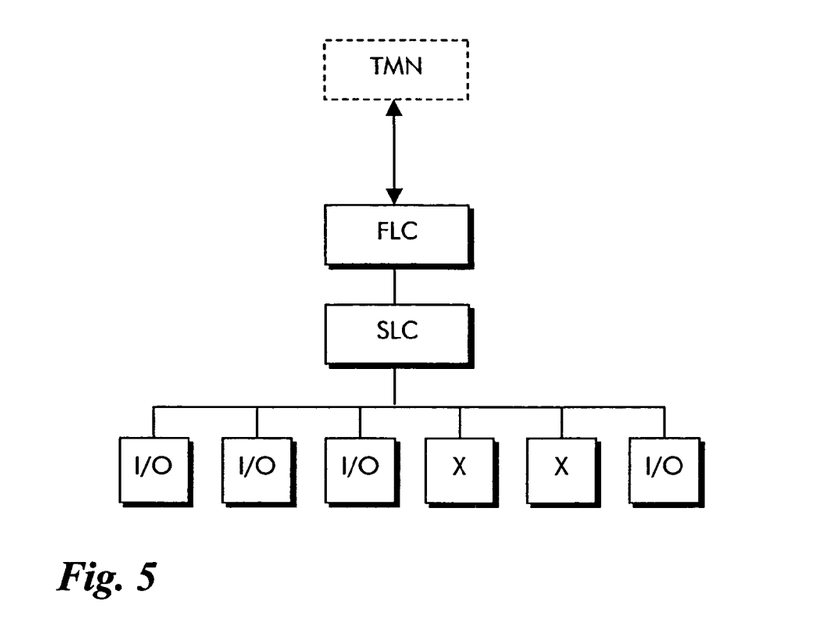
FIG. 5 shows the control and management of a network element.

The hardware design and control of a network element is shown schematically in FIG. 5. The network element itself consists of a number of hardware modules, such as input/output boards I/O and crossconnect matrix boards X shown in the embodiment by way of example. Interconnections and signal flow of transmission signals are not shown in FIG. 5. The individual boards are controlled and configured by a low level hardware controller, which is called second level controller SLC. The second level controller can be distributed among the boards, can consist of some few shelf controllers, or can also be a single controller if the network element is installed in only one shelf. It contains the hardware oriented control software which is termed firmware. The second level controller is controlled by a higher level controller called the first level controller FLC. This first level controller contains for the purpose of network management an abstraction of the network element and its resources in the form of a management information base (MIB). The MIB contains managed objects respectively representing the physical and logical resources of the entire network element and their configuration. A virtual hardware module and a firmware adaptor interface the MIB in the first level controller towards the firmware in the second level controller.

The first level controller FLC is controlled by a network management system or management plane TMN, which may be a central network management system for the entire network. The interface between the central network management system and the network elements is known as the Q-interface for which a standardized protocol exists. Alternatively, the management plane may be a distributed network management system where each network element is controlled by an individual element controller and where these element controllers communicate with each other using the recently defined GMPLS protocol to find a route through the network and establish network paths. Communication within the management plane and towards the network elements uses a dedicated packet switched control network distinct from the transport network. However, some or even all interconnections in this dedicated control network may use the so-called data communication channels existing in the section overhead of transmission signals in the transport network for the purpose of office-to-office data communication.

The management plane TMN is responsible to properly configure the entire network. If for example a new connection is to be established in the network, the management plane instructs the first level controllers of the affected network elements to switch the new connection. The first level controllers reconfigure their abstract view of the corresponding network elements accordingly and update their persistent configuration data. Then the request is forwarded to the second level controller, which determines the actual hardware modules involved and reconfigures these to establish the connection as requested.

In reverse direction, the second level controller monitors the hardware modules for any alarm and failure conditions and reports these to the first level controller. The first level controller maps alarm and failure reports on the abstraction and reports any irregularities to the management plane.

In known restoration mechanisms, the management plane needs to localize a failure by correlating received alarm reports and requests the affected network elements to switch new crossconnections to establish a dynamically calculated or pre-calculated backup path. However, from the above explained, it becomes evident, that this process requires extended time-consuming communication and processing, which sums up to a considerably high restoration time.

Therefore, the present invention provides information about pre-calculated backup paths at the lowest level, i.e., in the second level controller SLC or even with the hardware as such and triggers switching of the local crossconnections necessary to establish a backup path in the event of a failure with locally available information, only.

Figure 6:
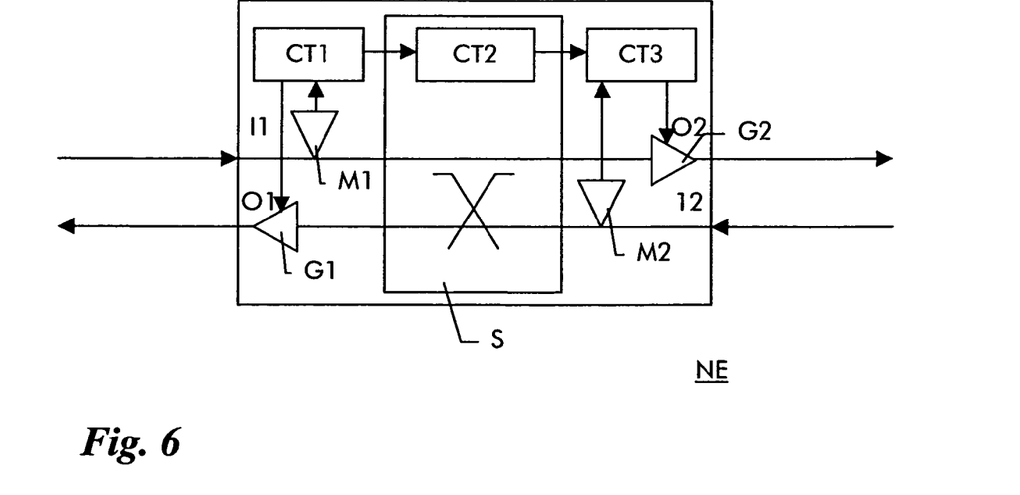
FIG. 6 shows the principle of path restoration performed by a network element in the transport network.

FIG. 6 shows a network element NE with a first input port I1 and first output port O1 and a second input port I2 and a second output port O2. It has to be noted that these two input and output ports are shown only be way of example but that the network element has in reality more than only two input and output ports. A crossconnect matrix S in the network element is provided between the input ports to allow crossconnections from any input port to any output port under the control of a matrix controller CT2. Such crossconnections are semi-permanent through-connections for individual multiplexing units that repeat periodically in the received multiplex signal. Crossconnections thus appear as transparent connections on path level.

Ports I1 and O1 are controlled by I/O controller CT1 and I2 and O2 are controlled by I/O controller CT3. Controllers CT1 -CT3 form the second level controller of the network element. A first level controller is not shown in the figure since according to the invention, backup paths are through-connected without interaction of the first level controller and the superordinate management plane.

A monitor M1 is provided at the input I1, which monitors received traffic streams. In particular, the monitor reads the K3 bytes in the path overhead of received transmission signal and checks the labels of the individual paths contained in the received transmission signal. If a received label corresponds to the previously configured label, then everything is all right. If the monitor M1 detects a mismatch between a received label and the configured label, then it raises a corresponding alarm towards the I/O controller CT1 and reports the received label. This is particularly the case when a new traffic stream is received at the input port I1, for example due to a restoration action of the preceding network element. The I/O controller CT1 checks then a LBR table stored in an memory of the controller to determine to which output port the newly received traffic stream shall be crossconnected and instructs the matrix controller M2 accordingly.

A pattern generator G1 is provided at the output port O1, which serves to generate an idle signal referred to as an unequipped signal in currently unused time slots that represent the restoration resources. A similar pattern generator G2 is also foreseen at output port O2.

It should be noted that transmission signals are multiplex signals and carry more than one tributary signals. In the preferred embodiment, the transmission signals are structured according to the SDH. This means, a transmission signal is a continuous bit stream subdivided into frames with a length of 125 µs, each. The frames are called synchronous transport modules STM-N (N=1, 4, 16, 64 or 256). Each STM-4 frame for example contains four higher order multiplex units VC-4, which in turn can contain either three lower order multiplex units VC-3, 21 lower order multiplex units VC-2 or 63 lower order multiplex units VC-12, each, or any suitable combinations thereof. Each multiplex unit represents a path through the network. The multiplex units carry the actual tributary signals and are repeated within each successive frame in exactly the same order. This is called the structure of the multiplex signal which is normally only altered by the management plane to establish new paths or to change or delete existing paths. Idle multiplex positions within the payload section of a frame are filled with dummy multiplex units carrying the so-called unequipped signal.

In order to be able to properly process the received transmission signal and in order to check consistency of the bit stream received, each receive interface has to know exactly the structure of the expected multiplex signal, i.e., which and how many multiplex units are multiplexed into each frame. Though, when new paths are created and the structure of the multiplex signal is thus changed, the receive end interface has to be reconfigured to accept the new multiplex structure. If the received multiplex structure does not match with the configured multiplex structure, the receive interface raises a mismatch alarm, which normally means that there is something wrong in the network, e.g., because a human operator has accidentally mixed up some cables.

According to the present invention, a protection path is automatically activated without prior reconfiguration of the receive side and the alarm thus provoked is used to trigger a table look-up to determine the destination of the multiplex units representing the new protection path. As explained above, this requires to identify the multiplex units, which is achieved by the invention through the use of path labels.

The invention claimed is:

1. A method of setting up a backup path in a transport network, wherein the transport network comprises a number of physically interconnected network elements, the method comprising:

assigning labels to paths in the transport network;

providing pre-configured backup tables to at least some network elements in the network, the backup tables defining the assigned labels and a route through the network for the backup path;

activating the backup path at a first network element by inserting into a restoration resource available at a physical link along the route of the backup path the label of the backup path as defined by the backup table locally stored in the first network element; and upon receipt of the backup path label at a second network element, determining an output port of the second network element for the backup path using the backup table locally stored in the second network element, wherein a plurality of restoration resources available for the backup path form a restoration group, the backup tables define restoration groups per path labels, and the first and second network elements select a particular restoration resource from the restoration groups for the backup path according to pre-determined rules, wherein a path in the transport network is represented by a sequence of multiplex units transmitted at a predetermined frame position within consecutive frames and wherein idle frame positions in said frames constitute said restoration resources.

2. The method according to claim 1, wherein within a restoration group, each resource has assigned a resource number and wherein the predetermined rules include that from the selected restoration group the restoration resource with the lowest resource number shall be selected.

3. The method according to claim 1, wherein within a restoration group, the path has assigned a priority and wherein the predetermined rules include that in case of contention the path with the higher priority is kept and the request for the path with the lower priority removed.

4. The method according to claim 1, wherein the predetermined rules include that in the case of a contention, which one of the two network elements adjacent to the contention selects a different resource to resolve the contention.

5. The method according to claim 4, wherein the network element having the higher node ID selects another resource to resolve the contention.

6. A network element for a transport network comprising:
at least one input port designed for the reception of a transmission signal comprising frames, wherein a sequence of multiplex units transmitted at a predetermined frame position in consecutive frames represents a path through the transport network, and wherein idle frame positions in the frames constitute restoration resources;
a low-level control facility controlling the input port and comprising a memory for storing a backup table provided to the network element, the backup table defining labels and a route through the network for a backup path;
a switch matrix for connecting the multiplex units from the input port to any of a number of output ports under the control of the low-level control facility;
wherein the low-level control facility is adapted to activate the backup path by selecting an output port from the backup table and by inserting into a restoration resource available at the selected output port the label of the backup path as defined by the backup table locally stored in the first network element;
wherein more than one restoration resources available for the backup path form a restoration group, the backup table defines restoration groups per path labels, and the low-level control facility selects a particular restoration resource from the restoration groups for the backup path according to pre-determined rules.

7. A network element for a transport network comprising:
at least one input port designed for the reception of a transmission signal comprising frames, wherein a sequence of multiplex units transmitted at a predetermined frame position in consecutive frames represents a path through the transport network, and wherein idle frame positions in the frames constitute restoration resources;
a low-level control facility controlling the input port and comprising a memory for storing a backup table provided to the network element, the backup table defining labels and a route through the network for a backup path;
a monitor assigned to the input port for checking path labels received at the input port and
a switch matrix for connecting the multiplex units from the input port to any of a number of output ports under the control of the low-level control facility;
wherein the low-level control facility is adapted to determine an output port for a backup path using the backup table upon receipt of a backup path label at the input port and to configure the switch matrix to establish an internal cross-connection between the input port and the selected output port to set up the backup path; and
wherein more than one restoration resources available for the backup path form a restoration group, the backup table defines restoration groups per path labels, and the low-level control facility selects a particular restoration resource from the restoration groups for the backup path according to pre-determined rules.

8. The method according to claim 1, wherein the path is identified on a basis of links.

9. The method according to claim 8, wherein the path uses different labels on each of the links.

10. The method according to claim 8, wherein, when a failure is detected in one of the links, a first and a second node adjacent to the link insert their own respective node identification rather than the label of the path, in a reverse direction.

11. The method according to claim 1, wherein each of the locally stored backup table includes a destination link and a next label.

12. The method according to claim 1, wherein each of the locally stored backup tables define more backup paths than backup capacity available.

13. The method according to claim 1, wherein the multiplex units are repeated with each successive frame in same order.

14. The method according to claim 1, wherein the frames comprise at least one virtual container, wherein the virtual container corresponds to a higher order multiplexing unit called virtual container.

15. The method according to claim 14, wherein the at least one virtual container comprises a path overhead and a payload section.

16. The method according to claim 15, wherein the labels are transported in the path overhead of the multiplex units.

17. The method according to claim 1, wherein the activating the backup path uses an internal tandem connection (ITC), which is added to the path overhead or removed from the path overhead.

18. The method according to claim 1, wherein when a failure occurs a particular label is inserted in to the POH of an idle multiple unit.

19. The method according to claim 1, wherein the multiplex unit corresponds to a timeslot.

20. The method according to claim 1, wherein the multiplex unit corresponds to a set of timeslots.

* * * * *